(12) United States Patent
Gao et al.

(10) Patent No.: US 11,675,956 B2
(45) Date of Patent: Jun. 13, 2023

(54) PRUNING REDUNDANT BUFFERING SOLUTIONS USING FAST TIMING MODELS

(71) Applicant: Cadence Design Systems, Inc., San Jose, CA (US)

(72) Inventors: Jhih-Rong Gao, Austin, TX (US); Yi-Xiao Ding, Austin, TX (US); Zhuo Li, Austin, TX (US)

(73) Assignee: Cadence Design Systems, Inc., San Jose, CA (US)

( * ) Notice: Subject to any disclaimer, the term of this patent is extended or adjusted under 35 U.S.C. 154(b) by 248 days.

(21) Appl. No.: 17/219,748

(22) Filed: Mar. 31, 2021

(65) Prior Publication Data

US 2022/0318480 A1    Oct. 6, 2022

(51) Int. Cl.
*G06F 30/30* (2020.01)
*G06F 30/398* (2020.01)
*G06F 30/392* (2020.01)
*G06F 111/04* (2020.01)
*G06F 117/10* (2020.01)
*G06F 119/12* (2020.01)

(52) U.S. Cl.
CPC .......... *G06F 30/398* (2020.01); *G06F 30/392* (2020.01); *G06F 2111/04* (2020.01); *G06F 2117/10* (2020.01); *G06F 2119/12* (2020.01)

(58) Field of Classification Search
CPC .. G06F 30/398; G06F 30/392; G06F 2111/04; G06F 2117/10; G06F 2119/12
USPC ......................................................... 716/100
See application file for complete search history.

(56) References Cited

U.S. PATENT DOCUMENTS

| 8,640,066 B1 * | 1/2014 | Gupta | G06F 30/327 |
| | | | 716/108 |
| 11,520,959 B1 * | 12/2022 | Ding | G06F 30/39 |

* cited by examiner

*Primary Examiner* — Jack Chiang
*Assistant Examiner* — Brandon Bowers
(74) *Attorney, Agent, or Firm* — Schwegman Lundberg & Woessner, P.A.

(57) ABSTRACT

A system includes a machine configured to perform operations including accessing an integrated circuit design including a buffer tree that interconnects a plurality of inputs and buffers. The buffer tree includes a baseline timing characteristic. The operations include identifying a set of candidate solutions for improving the baseline timing characteristic using an initial timing model and selecting a subset of candidate solutions that have a timing characteristic lower than the baseline timing characteristic. Then the subset of candidate solutions are evaluated using a detailed timing model and based on determining that at least one candidate solution in the subset has a timing characteristic that is better than the baseline timing characteristic, selecting a candidate solution from the set of candidate solutions, and updating the buffer tree based on the candidate solution.

12 Claims, 7 Drawing Sheets

PRUNING REDUNDANT BUFFERING SOLUTIONS USING FAST TIMING MODELS

TECHNICAL FIELD

The present disclosure generally relates to the technical field of integrated circuit design. In particular, the present disclosure addresses techniques for pruning redundant buffering solutions guided by fast timing models.

BACKGROUND

An integrated circuit (IC) comprises cells of similar and/or various sizes, and connections between or among the cells. A cell includes several pins interconnected by wires to pins of one or more other cells. A net includes interconnections between a set of pins to form connections between or among the pins. An IC design may include multiple nets. A design netlist specifies the connections between the pins.

Design engineers design IC's by transforming circuit descriptions of the IC's into geometric descriptions, called layouts. To create layouts, design engineers typically use electronic design automation (EDA) applications. These applications provide sets of computer-based tools for creating, editing, and analyzing IC design layouts.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
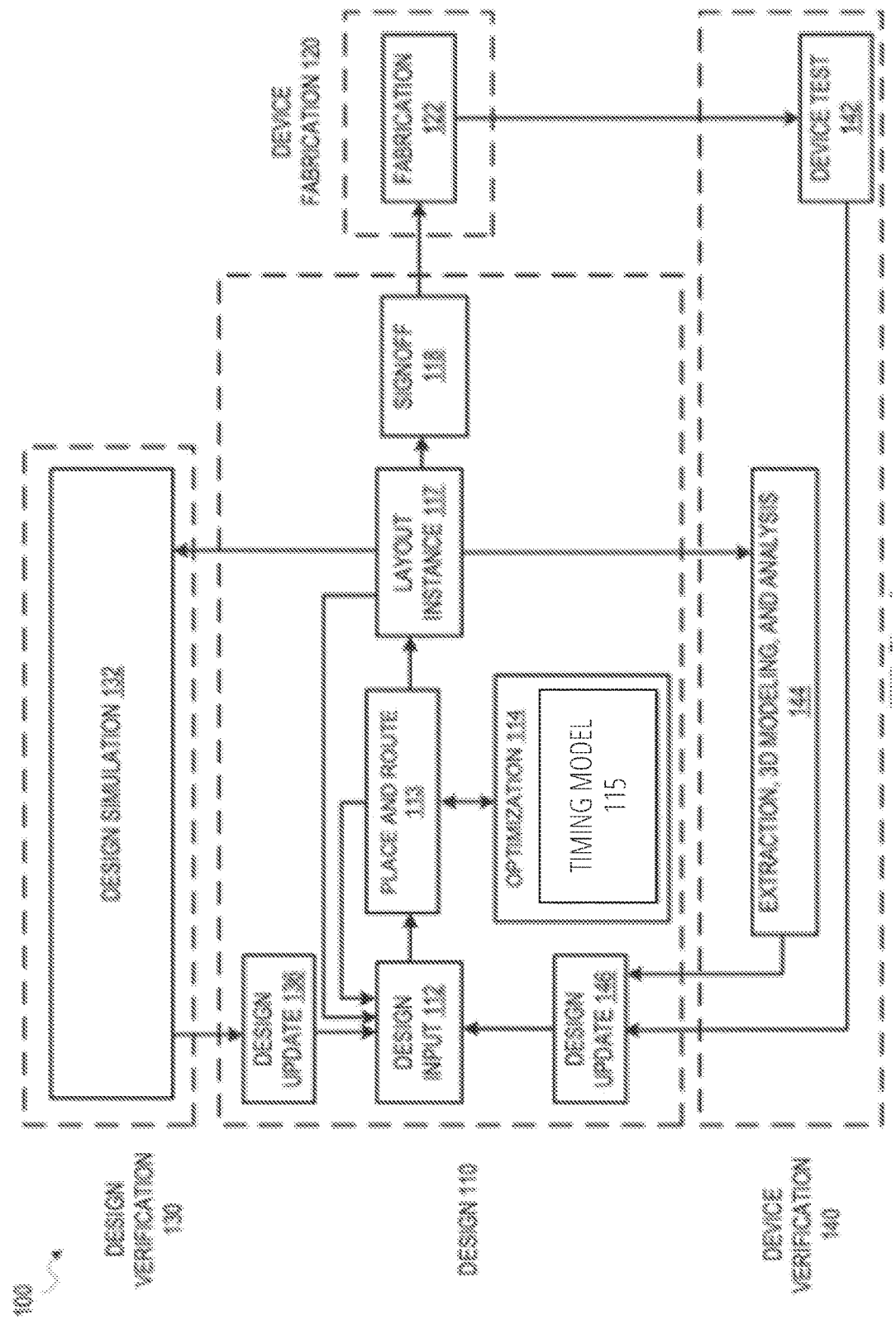
FIG. 1 is a diagram illustrating an example design process flow, in accordance with some embodiments.

Reference will now be made in detail to specific example embodiments for carrying out the inventive subject matter. Examples of these specific embodiments are illustrated in the accompanying drawings, and specific details are set forth in the following description in order to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Integrated circuits are used for a wide variety of electronic applications, from simple devices to complex computer systems.

An integrated circuit chip (IC) can be thought of as a collection of logic cells with electrical interconnections between the cells, formed on a semiconductor substrate. An IC may include a very large number of cells and require complicated connections between the cells. A cell is a group of one or more circuit elements such as transistors, resistors, capacitors, inductors, and other basic circuit elements grouped together to perform a logic function.

An IC chip is fabricated by first conceiving the logical circuit description, and then converting the logical circuit description into a physical description, or geometric layout. This process is usually carried out using a "netlist" which is a record of all of the nets, or interconnections, between the cell pins. A layout typically consists of a set of planar geometric shapes in several layers. The layout is then checked to ensure it meets all of the design requirements, particularly timing requirements. The result is a set of design files known as an intermediate form that describes the layout. The design files are then converted into pattern generator files that are used to produce patterns called masks by an optical or electron beam generator.

EDA applications create layouts by using geometric shapes that represent different materials and devices on IC's. For instance, EDA tools commonly use rectilinear lines to represent the wire segments that interconnect the IC components. These tools also represent electronic and circuit IC components as geometric objects with varying shapes and sizes.

The IC design process entails various operations. Some of the physical-design operations that EDA applications commonly perform to obtain the IC layouts are: (1) circuit partitioning, which partitions a circuit if the circuit is too large for a single chip; (2) floor planning, which finds the alignment and relative orientation of the circuit modules; (3) placement, which determines more precisely the positions of the circuit components; (4) routing, which completes the interconnects between or among the circuit components; and (5) verification, which checks the layout to ensure that it meets design and functional requirements.

Placement and routing are key operations in the physical design cycle and are often referred to collectively as a "place and route" stage. During placement, exact locations are assigned to various components within an IC's core area. Further optimizations are often performed to fix timing and design rule violations in the design. EDA applications often include buffer insertion engines that insert buffers or inverters at exact locations while optimizing circuit characteristics according to design rules. A buffering engine takes a synthesized netlist together with a technology library and produces a placement layout.

Routing is generally divided into two phases: global routing and detailed routing. For each net, global routing generates a routing topology that includes an approximate routing path for the interconnect lines that are to connect the pins of the net. After the routing topology has been created, detailed routing creates specific individual routes for each net. Place-and-route is a typical stage in integrated circuit (IC) design. After place and route, a design rule violation (DRV) stage is often performed to fix DRVs (e.g., a maximum capacitance violation, a maximum fanout violation, or a maximum transition violation) in an IC design.

In advanced technology nodes, buffer insertion is a common approach for DRV and timing fixing. Van Ginneken's algorithm is a frequently used technique to perform bottom-up buffer insertion. Van Ginneken's algorithm and other conventional approaches use a dynamic programming approach to evaluate whether a buffer or inverter is to be inserted into one of potentially many candidate insertion locations in the design based on a cost function that seeks to minimize "costs" resulting from inserting the buffer or inverter into the design. These "costs" may, for example, include a chip area utilized by an inserted buffer or inverter. Although these conventional techniques seek to fix deficiencies with respect to certain design rules such as slew constraints, these conventional techniques fail to account for other rules and constraints that may be associated with a design.

Conventional methods use a detailed timing model to analyze all potential solution candidates and select the one solution that has the best timing improvement while satisfying all design constraints. In some cases, none of the candidates satisfies the design constraints and the evaluator ends up wasting time and resources.

Therefore, there is a need for methods and systems to implement a pre-evaluation operation to prune redundant buffering solutions prior to processing buffering solutions through a detailed evaluator. As described herein, methods and systems provide a technical solution including evaluating buffering solutions using a fast timing model to prune redundant or useless buffering solutions before the solutions are evaluated using a detailed and costly model. Additionally, the methods and systems described herein provide significant processing power savings at runtime by detecting, pre-detailed processing, that there are no solutions that provide a timing reduction for the buffer tree.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of a method may be performed by one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

FIG. 1 is a diagram illustrating an example design process flow that includes a buffer insertion operation in accordance with some embodiments. As shown, the design process flow 100 includes a design phase 110, a device fabrication phase 120, a design verification phase 130, and a device verification phase 140. The design phase 110 involves an initial design input 112 operation where the basic elements and functionality of a device are determined, as well as revisions based on various analyses and optimization of a circuit design. This design input 112 operation is where block instances are used in the circuit design and any additional circuitry for the design around the blocks is selected. The initial strategy, tactics, and context for the device to be created are also generated in the design input 112 operation, depending on the particular design algorithm to be used.

In some embodiments, following an initial selection of design values in the design input 112 operation, routing, placement, and timing analysis are performed in a place and route 113 operation, and optimization is performed in an optimization 114 operation along with any other automated design processes. While the design process flow 100 shows place and route 113 and optimization 114 occurring prior to a layout instance 117, routing, placement, timing analysis, and optimization may be performed at any time to verify operation of a circuit design. For instance, in various embodiments, timing analysis in a circuit design may be performed prior to routing of connections in the circuit design, after routing, during register transfer level (RTL) operations, or as part of a signoff 118, as described below.

As shown, the optimization 114 operation includes a timing model 115 that may include both a fast and detailed timing model. During optimization operation 114, a fast and/or a detailed timing model may be used to determine various implementations of driver resizing and buffer insertions. For example, the design process flow 100 may utilize one or more cell libraries that provide multiple cell types including multiple buffer and inverter types to generate the buffering candidates. Buffering candidates may be generated by inserting various cell types at each candidate insertion location. Each buffering candidate indicates a particular candidate insertion location along with a buffer or inventor of a particular type inserted at the candidate insertion location.

After design inputs are used in the design input 112 operation to generate a circuit layout, and any of the routing and optimization 114 operations are performed, a layout is generated in the layout instance 117. The layout describes the physical layout dimensions of the device that match the design inputs. Prior to this layout being provided to a fabrication 122 operation, the signoff 118 is performed on the circuit design defined by the layout.

After signoff verification by the signoff 118, a verified version of the layout is used in the fabrication 122 operation to generate a device, or additional testing and design updates may be performed using designer inputs or automated updates based on design simulation 132 operations or extraction, 3D modeling, and analysis 144 operations. Once the device is generated, the device can be tested as part of device test 142 operations, and layout modifications generated based on actual device performance.

A design update 136 from the design simulation 132; a design update 146 from the device test 142 or the extraction, 3D modeling, and analysis 144 operations; or the design input 112 operation may occur after the initial layout instance 117 is generated. In various embodiments, whenever design inputs are used to update or change an aspect of a circuit design, a timing analysis and the routing and optimization 114 operation may be performed.

Figure 2:
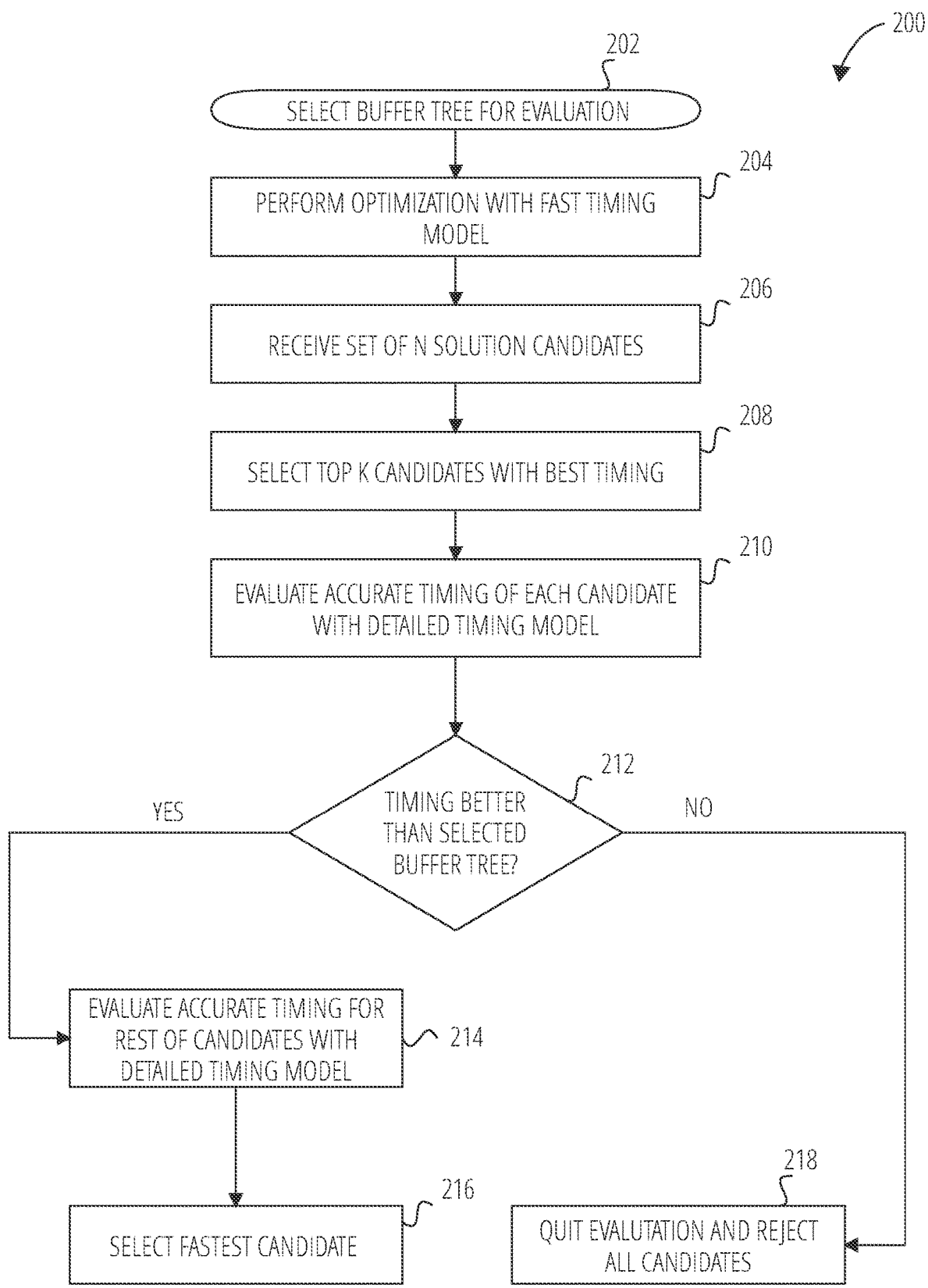
FIG. 2 illustrates a flow diagram generally describing the operations in performing a method of pruning redundant buffering solutions using fast timing models, in accordance with some embodiments.

FIG. 2 illustrates a flow diagram generally describing the operations in performing a method of pruning redundant buffering solutions using fast timing models in accordance with some embodiments.

It will be understood that the method 200 may be performed by a device, such as a computing device executing instructions of an EDA software system. For instance, the operations of a method 200 may be represented by executable instructions (e.g., EDA software) that, when executed by a processor of a computing device, cause the computing device to perform the method 200. Thus, an operation of the method 200 may be performed by a hardware processor (e.g., central processing unit or graphics processing unit) of a computing device (e.g., desktop, server, etc.). Accordingly, the method 200 is described below in reference to such a computing device.

Depending on the embodiment, an operation of the method 200 may be repeated in different ways or involve intervening operations not shown. Though the operations of the method 200 may be depicted and described in a certain order, the order in which the operations are performed may vary among embodiments, including performing certain operations in parallel.

Method 200 as illustrated begins at operation 202 at a selected buffer tree (e.g., input buffer tree) to be evaluated. At operation 204, the computing device performs optimization of the buffer tree with a fast timing model. The fast-timing model outputs a set of N solution candidates at operation 206. At operation 208, the fastest, or top K candidates with the best timing are selected. For example, the fast-timing model outputs a set of N=10 solution candidates and the top K=3 candidates are selected at operation 208.

Each of the selected top candidates are evaluated by a detailed timing model, the results of which are compared against the received timing characteristics from the fast-timing model at operation 210. In accordance with a determination at operation 212 that at least one of the top candidates has a timing characteristic better (e.g., faster) than the baseline timing characteristic of the selected buffer tree, the rest of the candidates are evaluated using the detailed timing model at operation 214. If none of the selected top candidates has a timing better than the baseline of the input buffer tree, the evaluation ends and the candidates from the fast-timing model output are rejected at operation 218.

Based on evaluating the rest of the candidates with the detailed timing model at operation 214, the method 200 continues at operation 216 by selecting the fastest candidate from the set of solution candidates that have been processed through both the fast and detailed timing models. The selected candidate is used to replace the input buffer tree. In some embodiments, an indicator is provided to a user that the selected buffer tree has been replaced by a faster buffer tree. In some embodiments, if the method terminated at operation 218, an indicator is provided that the selected buffer tree remains the same.

Figure 3A:
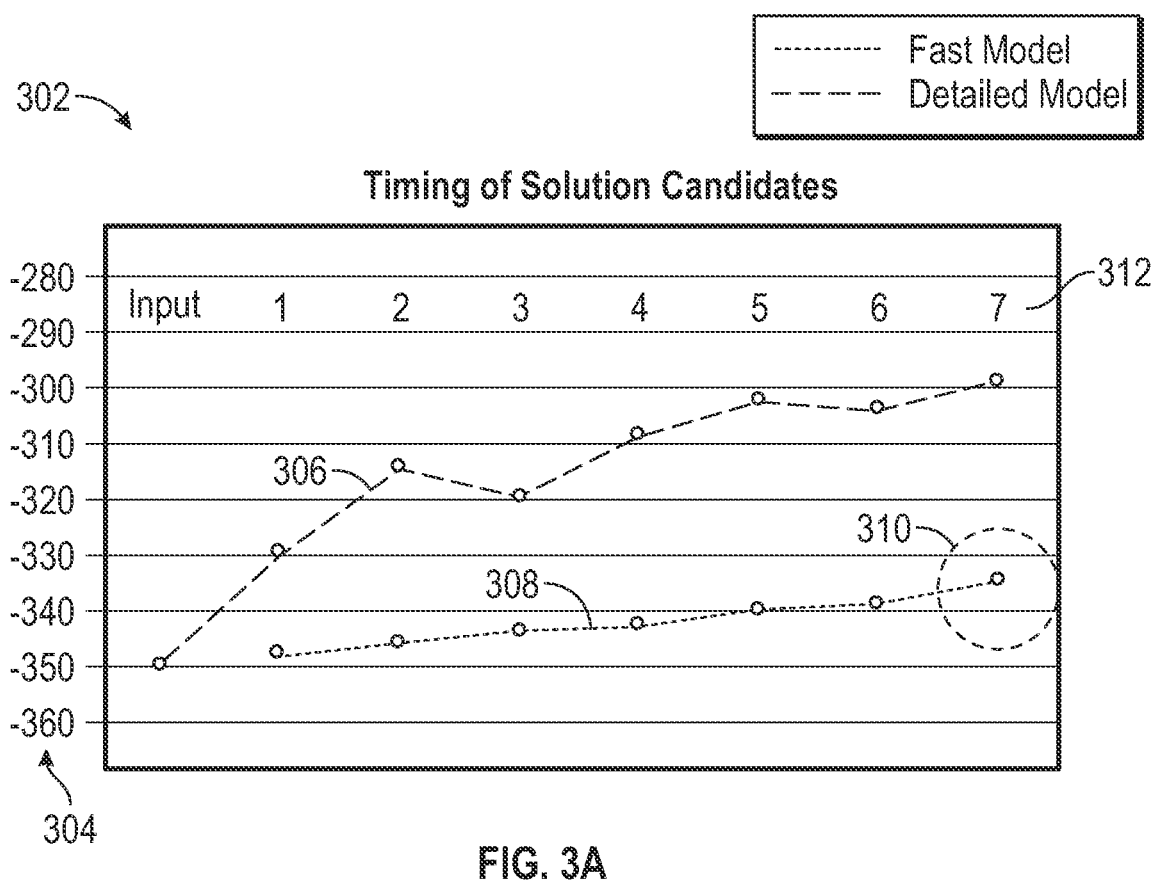
FIGS. 3A-3C are illustrations of candidate timing solutions for updating a buffer tree, in accordance with some embodiments.

FIG. 3A is an illustration of a candidate timing solutions for updating a buffer tree in accordance with some embodiments. Graph 302 shows a comparison of timing solutions calculated for various solutions using two different models (e.g., fast model and detailed model). Line graph 306 indicates the timing of various solutions obtained by using a detailed model. Line graph 308 indicates the timing of various solutions obtained by using a fast-timing model. It is understood that in some embodiments, both the fast-timing model line graph and the detailed model line graphs are generated and in other embodiments, only the fast-timing model line graph is generated as the detailed model is not run (described in more detail with respect to FIG. 3C). Typically, the detailed model provides a more accurate timing as compared to the fast model. However, the detailed model takes more time to process and may require more resources (e.g., hardware processing power).

As seen in FIG. 3A, solutions 1-7 are compared against the input shown as the x-axis at 312. The y-axis at 304 provides the timing for each solution as well as the input (e.g., original or baseline). In FIG. 3A, a pre-evaluation process is performed and a set of 7 candidate solutions are identified. For simplicity and ease of explanation, it is assumed that the top K candidates are selected, with K=1. As seen in the graph, solution #7 (e.g., solution 310) has the best timing characteristic (shortest time delay). Detailed evaluation is performed on solution #7 to obtain its accurate timing. Solution #7's accurate timing is approximately −300, even faster than originally calculated by the fast timing model. Since solution #7 has a faster timing than the input at −350, the rest of the candidates are evaluated using the detailed model.

After evaluating each of the solutions 1-7 using the detailed model, it is still seen that solution 7 has the fastest timing characteristic. In some embodiments, solution #7 is selected as the replacement to the input buffer tree and the computing device provides an indication that the data path timing characteristic has improved. In some embodiments, the indication includes a delta between the baseline timing (from the input) and the selected replacement solution (e.g., solution #7).

Figure 3B:
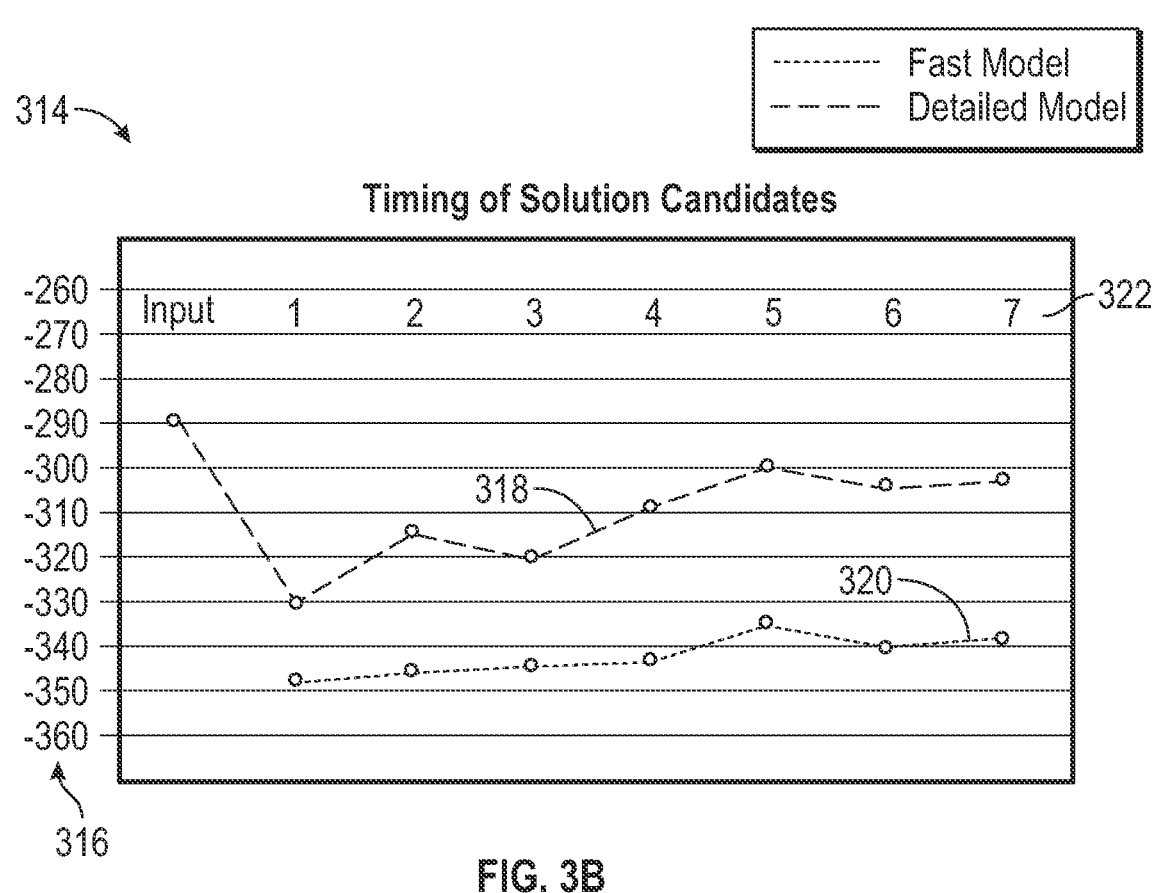

FIG. 3B is an illustration of a second example of generating timing solutions for updating a buffer tree in accordance with some embodiments. Graph 314 shows a comparison of timing solutions calculated for various solutions using two different models (e.g., fast and detailed timing models). Similar to FIG. 3A, solutions 1-7 are compared against the input shown as the x-axis at 322. The y-axis at 316 provides the timing characteristic for each solution as well as the input (e.g., original or baseline). In graph 314, the input timing is −290. The fast timing model graph 320 shows that none of the solution candidates 1-7 have a faster timing than the input of −290. In some embodiments, the analysis concludes without further action by the computing device. The detailed model timing graph 318 is shown simply to illustrate the accuracy of the conclusion that there are no available solutions that provide a faster timing solution than provided by the input. According to the methods and systems described herein, after a determination is made that none of the solutions 1-7 are faster than the input, the detailed model is not called upon and the input is accepted as being the best solution and the operations of the method terminates.

Figure 3C:
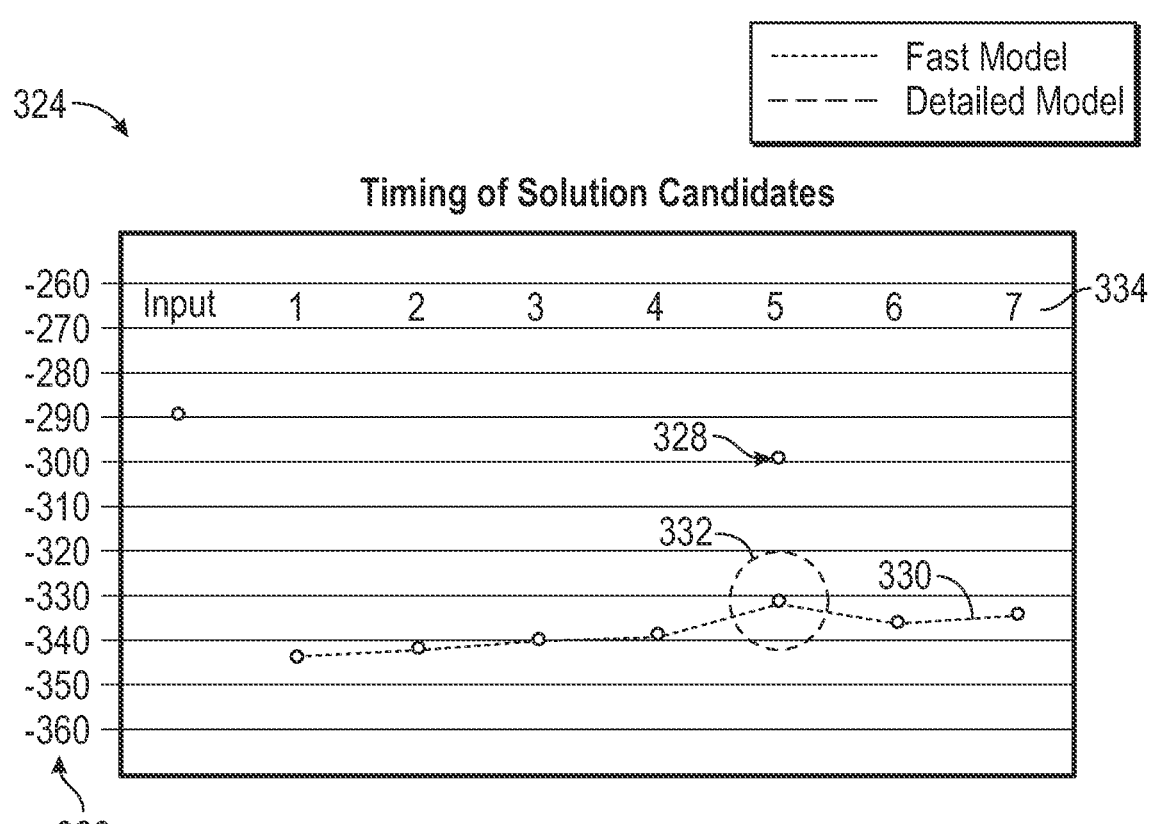

FIG. 3C is an illustration of a third example of generating timing solutions for updating a buffer tree in accordance with some embodiments. Graph 324 shows a comparison of timing solutions calculated using two different models (e.g., fast and detailed). The fast-timing model graph 330 shows that solution candidate 332 has been selected for further evaluation using the detailed timing model. Similar to FIG. 3B, solutions 1-7 are compared against the input shown as the x-axis at 334. The y-axis at 326 provides the timing characteristic for each solution as well as the input (e.g., original or baseline). In graph 324, out of solutions 1-7, solution 5 (e.g., solution 332) is selected for further analysis.

Solution 5 is evaluated using the detailed timing model to output a timing characteristic 328 of −300. This detailed timing characteristic 328 is slower than the input timing characteristic of −290. Since the identified "best" solution is in fact, slower than the original input timing characteristics, the rest of the candidates 1-4, and 6-7 are not evaluated using the fast timing model, and all of the solutions 1-7 are rejected. The input is determined to be the best solution and no further operations are performed.

Figure 4:
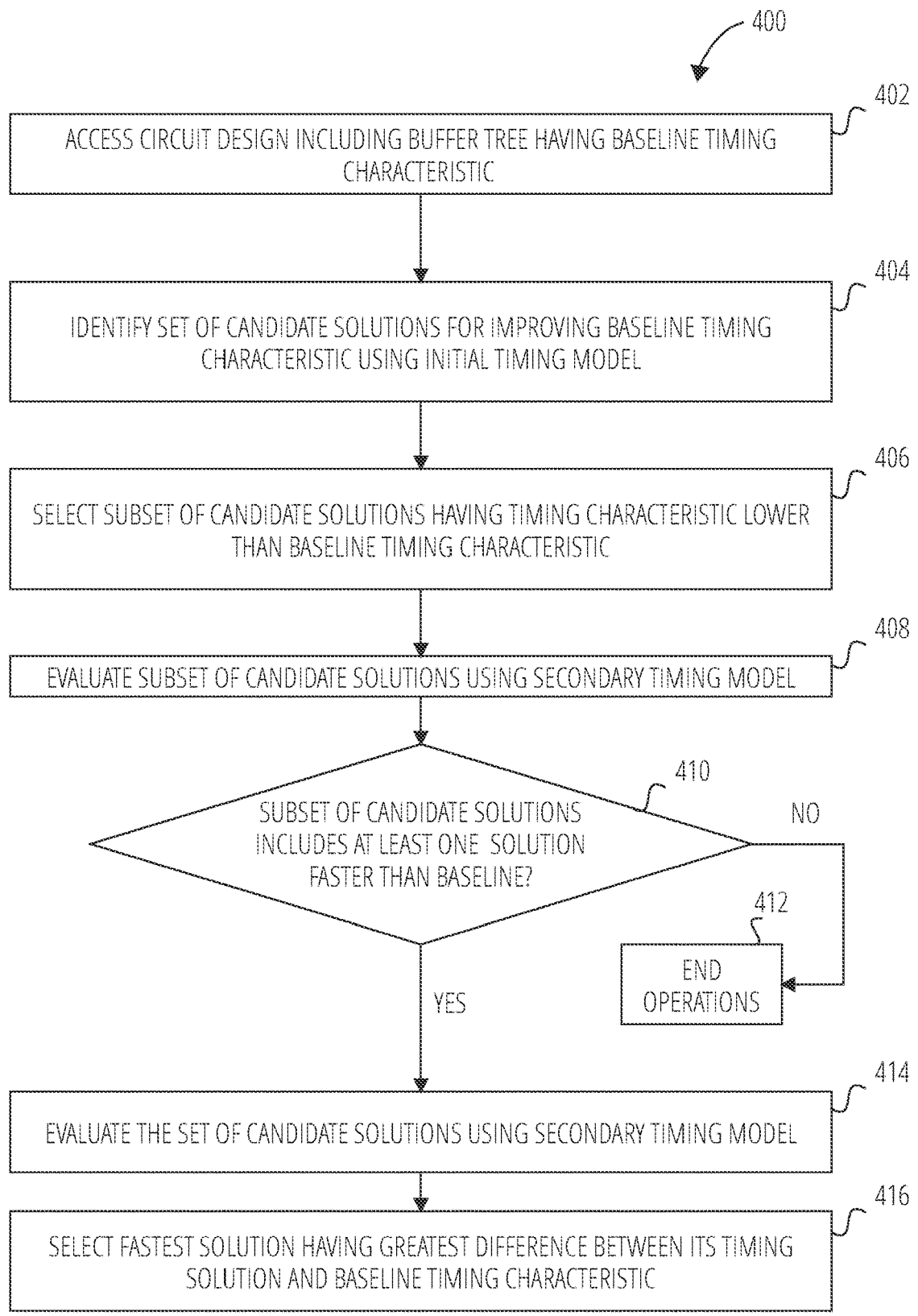
FIG. 4 illustrates a flow diagram of a method for performing pre-evaluation pruning of candidate buffering solutions, in accordance with some embodiments.

FIG. 4 is a flow diagram of a method for performing pre-evaluation pruning of timing solutions in accordance with some embodiments. It will be understood that the method 400 may be performed by a device, such as a computing device executing instructions of an EDA software system. For instance, the operations of a method 200 may be represented by executable instructions (e.g., EDA software) that, when executed by a processor of a computing device, cause the computing device to perform the method 400. Thus, an operation of the method 400 may be performed by a hardware processor (e.g., central processing unit or graphics processing unit) of a computing device (e.g., desktop, server, etc.). Accordingly, the method 200 is described below in reference to such a computing device.

Depending on the embodiment, an operation of the method 400 may be repeated in different ways or involve intervening operations not shown. Though the operations of the method 400 may be depicted and described in a certain order, the order in which the operations are performed may vary among embodiments, including performing certain operations in parallel.

Method 400 begins at operation 402 where a computing device accesses, from database in memory, a circuit design that includes a buffer tree. The buffer tree has a baseline timing characteristic.

At operation 404, the computing device generates an initial timing model to identify a set of candidate solutions for improving the baseline timing characteristic into an enhanced timing characteristic. In some embodiments, the initial timing model (e.g., fast timing model) is an approximation of timing characteristics for a given set of identified solutions. The enhanced timing characteristic is a faster timing than the baseline timing to improve data path timing for the circuit design.

A subset of candidate solutions is selected at operation 406, based on each candidate solution having a timing characteristic lower than the baseline timing characteristic. In some embodiments, if none of the candidate solutions have a timing characteristic lower than the baseline timing characteristic, the method concludes as the baseline timing characteristic is the fastest solution.

At operation 408, the subset of candidate solutions is evaluated by a secondary timing model (e.g., detailed timing model) to determine the detailed timing for each of the candidate solutions of the subset. In some embodiments, the subset of candidate solutions is evaluated by calculating a worst negative slack for each candidate solution. If the WNS is positive, the candidate solution passes and is kept as a final solution candidate. In some embodiments, the subset of candidate solutions is evaluated by calculating a total negative slack for each candidate solution. If the TNS of the solution is zero or close to zero, the solution meets timing requirements of the design and is kept as a final solution candidate. In some embodiments, determining a candidate solution has a better timing characteristic can including determining a candidate solution has a better TNS (or WNS) than a baseline TNS or (WNS) determining from the initial buffer tree.

In accordance with a determination that the subset of candidate solutions includes at least one enhanced (e.g., improved) solution having a timing characteristic faster than the baseline timing characteristic at operation 410, the method proceeds to operation 414. At operation 414, the computing device evaluates the set of candidate solutions using the secondary timing model (e.g., detailed timing model) to generate an accurate timing characteristic for each of the solutions within the set of candidate solutions. After the candidate solutions have been evaluated using the detailed timing model, the fastest solution is selected at operation 416. The fastest solution is the candidate solution having the greatest difference between its timing characteristic and the baseline timing characteristic.

In some embodiments, the fastest solution is verified to satisfy one or more design constraints of the buffer tree and/or the circuit design. In some embodiments, the second fastest solution is selected in accordance with a determination that the fastest solution does not satisfy one or more design constraints.

In accordance with a determination that the subset of candidate solutions does not includes at least one enhanced solution having a timing characteristic faster than the baseline timing characteristic at operation 410, the method selects the initial buffer tree as the fastest solution at operation 412.

In some embodiments, the input or buffer of the candidate solution is a resized input or buffer. In some embodiments, the candidate solution is an enhanced buffer tree to replace the input buffer tree. In some embodiments, the candidate solution includes one or more drivers and buffers.

In an example, an initial timing model identifies a set of 20 candidate solutions. Of the 20 candidate solutions, the fastest five solutions are selected as a subset. The subset may have a faster timing characteristic than the baseline timing characteristic of the current solution (referred to herein as the "input"). The fastest five solutions are then evaluated using a detailed timing model. The detailed timing model provides a precise timing characteristic for each of the five solutions. The detailed timing model's output timing characteristics may be different from the timing characteristic outputted by the initial timing model. Typically, the detailed timing model produces a more accurate timing characteristic than the fast timing model. The timing characteristics from the detailed model is analyzed for the five candidate solutions. If at least one of the five candidate solutions has a faster timing than the baseline, the detailed timing model is applied to all of the 20 candidate solutions. In some embodiments, the five candidate solutions initially selected are not re-evaluated. After evaluating all 20 candidate solutions, the fastest solution is selected and used to replace at least a portion of the buffer tree.

Figure 5:
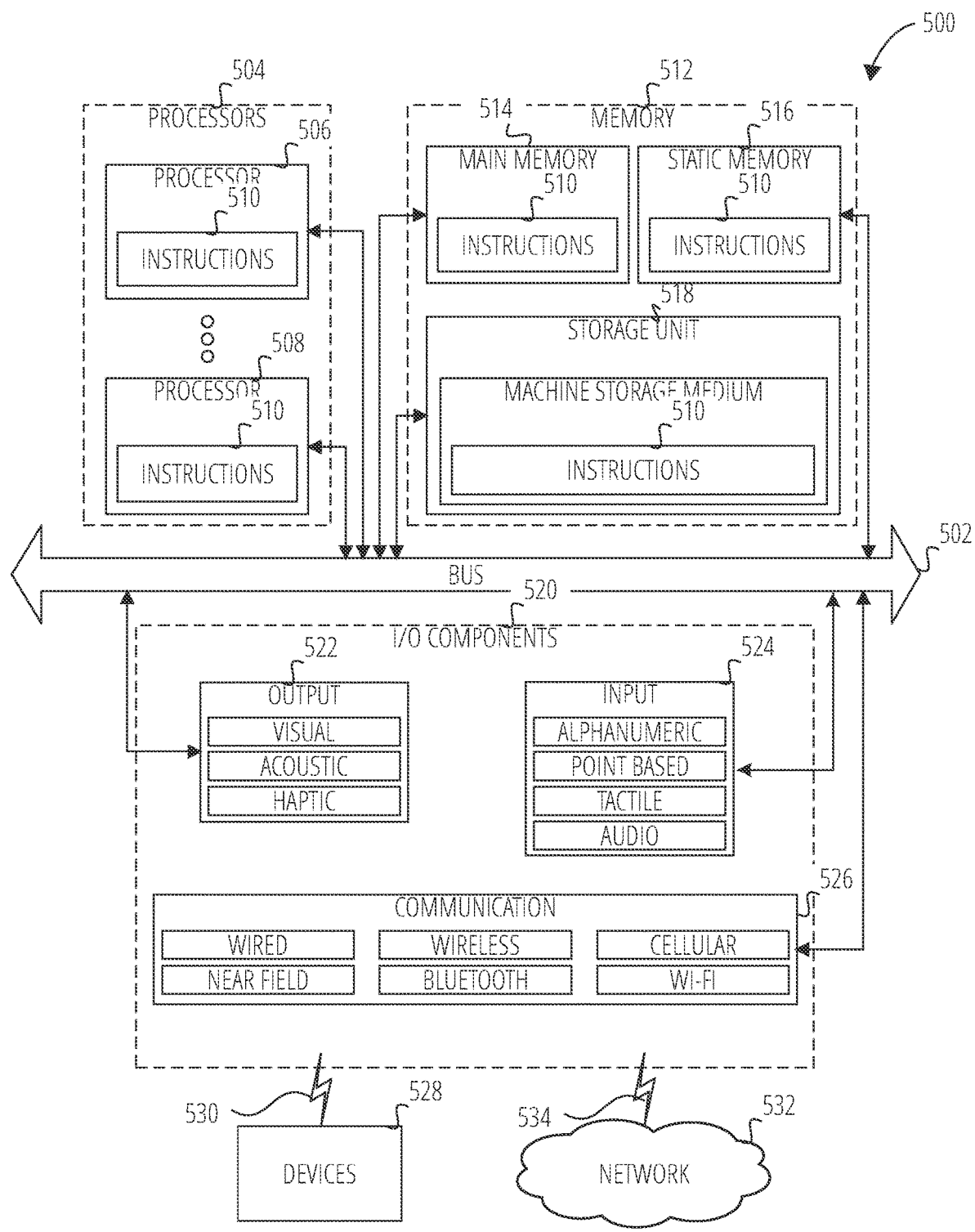
FIG. 5 illustrates a diagrammatic representation of a machine configured to perform any one or more of the methodologies discussed herein, in accordance with some embodiments.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 510 (e.g., software, a program, an application, an applet, an app, or other executable code) for causing the machine 500 to perform any one or more of the methodologies discussed herein may be executed. For example, the instructions 510 may correspond to an EDA software system that causes the machine 500 to execute the method 200 or 400. Additionally, or alternatively, the instructions 510 may implement FIGS. 1 and 3A-3C. The instructions 510 transform the general, non-programmed machine 500 into a particular machine 500, such as an EDA system, programmed to carry out the described and illustrated functions in the manner described here. In alternative embodiments, the machine 500 operates as a standalone device or may be coupled (e.g., networked) to other machines. In a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 510, sequentially or otherwise, that specify actions to be taken by the machine 500. Further, while only a single machine 500 is illustrated, the term "machine" shall also be taken to include a collection of machines 500 that individually or jointly execute the instructions 510 to perform any one or more of the methodologies discussed herein.

The machine 500 may include processors 504, memory 512, and I/O components 520, which may be configured to communicate with each other such as via a bus 502. In an example embodiment, the processors 504 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 506 and a processor 508 that may execute the instructions 510. The term "processor" is intended to include multi-core processors 504 that may comprise two or more independent processors (sometimes referred to as "cores") that may execute instructions 510 contemporaneously. Although FIG. 5 shows multiple processors 504, the machine 500 may include a single processor with a single core, a single processor with multiple cores (e.g., a multi-core processor), multiple processors with a single core, multiple processors with multiple cores, or any combination thereof.

The memory 512 may include a main memory 514, a static memory 516, and a storage unit 518, both accessible to the processors 504 such as via the bus 502. The main memory 514, the static memory 516, and the storage unit 518 store the instructions 510 embodying any one or more of the methodologies or functions described herein. The instructions 510 may also reside, completely or partially, within the main memory 514, within the static memory 516, within the storage unit 518, within at least one of the processors 504 (e.g., within the processor's cache memory), or any suitable combination thereof, during execution thereof by the machine 500.

The I/O components 520 may include a wide variety of components to receive input, provide output, produce output, transmit information, exchange information, capture measurements, and so on. The specific I/O components 520 that are included in a particular machine will depend on the type of machine. For example, portable machines such as mobile phones will likely include a touch input device or other such input mechanisms, while a headless server machine will likely not include such a touch input device. It will be appreciated that the I/O components 520 may include many other components that are not shown in FIG. 5. The I/O components 520 are grouped according to functionality merely for simplifying the following discussion and the grouping is in no way limiting. In various example embodiments, the I/O components 520 may include output components 522 and input components 524. The output components 522 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 524 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 520 may include communication components 526 operable to couple the machine 500 to a network 532 or devices 528 via a coupling 534 and a coupling 530, respectively. For example, the communication components 526 may include a network interface component or another suitable device to interface with the network 532. In further examples, the communication components 526 may include wired communication components, wireless communication components, cellular communication components, and other communication components to provide communication via other modalities. The devices 528 may be another machine or any of a wide variety of peripheral devices (e.g., a peripheral device coupled via a universal serial bus (USB)).

Executable Instructions and Machine Storage Medium

The various memories (e.g., 512, 514, 516, and/or memory of the processor(s) 504) and/or the storage unit 518 may store one or more sets of instructions and data structures (e.g., software) embodying or utilized by any one or more of the methodologies or functions described herein. These instructions, when executed by the processor(s) 504, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media, "computer-storage media," and "device-storage media" specifically exclude carrier waves, modulated data signals, and other such media, at least some of which are covered under the term "signal medium" discussed below.

Transmission Medium

In various example embodiments, one or more portions of the network 532 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 532 or a portion of the network 532 may include a wireless or cellular network, and the coupling 534 may be a Code Division Multiple Access (CDMA) connection, a Global System for Mobile communications (GSM) connection, or another type of cellular or wireless coupling. In this example, the coupling 534 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 510 may be transmitted or received over the network 532 using a transmission medium via a network interface device (e.g., a network interface component included in the communication components 526) and utilizing any one of a number of well-known transfer protocols (e.g., hypertext transfer protocol (HTTP)). Similarly, the instructions 510 may be transmitted or received using a transmission medium via the coupling 530 (e.g., a peer-to-peer coupling) to the devices 528. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 510 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor implemented. For example, at least some of the operations of a method may be performed by one or more processors. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:
   one or more processors of a machine; and
   at least one computer storage medium storing instructions, which, when executed by the machine, cause the machine to perform operations comprising:
   accessing a circuit design stored in memory, the circuit design comprising a buffer tree having a baseline timing characteristic;
   identifying a set of candidate solutions for improving the baseline timing characteristic using an initial timing model;
   selecting, based on the initial timing model, a subset of candidate solutions from the set of candidate solutions that have a timing characteristic lower than the baseline timing characteristic;
   evaluating the subset of candidate solutions using a secondary timing model;
   based on determining that at least one candidate solution in the subset of candidate solutions has a timing characteristic that is better than the baseline timing characteristic of the buffer tree, evaluating a remainder of candidate solutions from the set of candidate solutions using the secondary timing model;

selecting, a faster candidate solution after evaluating the set of candidate solutions using the secondary timing model; and replacing a portion of the buffer tree with the faster candidate solution.

2. The system of claim 1, wherein the selecting of the candidate solution comprises:

verifying that the candidate solution satisfies one or more design constraints of the buffer tree.

3. The system of claim 1, wherein updating the buffer tree based on the candidate solution comprises replacing one or more buffers in the buffer tree in accordance with the candidate solution.

4. The system of claim 1, wherein selecting the faster candidate solution comprises:

selecting a fastest candidate solution based on the candidate solution providing a greatest timing improvement to the baseline timing characteristic.

5. The system of claim 1, wherein evaluating the subset of candidate solutions comprises:

determining that the subset of candidate solutions does not include at least one improved solution having a timing characteristic faster than the baseline timing characteristic; and providing, to a user, an indication that the baseline timing characteristic is the improved timing characteristic for the buffer tree.

6. The system of claim 1, wherein the candidate solutions replace at least one of a driver or a buffer of the buffer tree.

7. The system of claim 6, wherein a driver or buffer of the candidate solutions comprises a resized input or buffer.

8. The system of claim 1, wherein the set of candidate solutions comprises a set of alternate arrangements of drivers and buffers of the buffer tree.

9. The system of claim 1, wherein selecting the subset of candidate solutions based on the initial timing model comprises determining an approximate timing characteristic of each candidate solution in the set of candidate solutions using the initial timing model.

10. The system of claim 1, wherein evaluating the subset of candidate solutions comprises determining an accurate timing characteristic of each candidate solution in the subset of candidate solutions using the secondary timing model.

11. The system of claim 1, wherein evaluating the subset of candidate solutions comprises calculating a worst negative slack for each candidate solution of the subset of candidate solutions.

12. The system of claim 1, wherein evaluating the subset of candidate solutions comprises calculating a total negative slack for each candidate solution of the subset of candidate solutions.

* * * * *